United States Patent [19]
Kam

[11] Patent Number: 5,570,459
[45] Date of Patent: Oct. 29, 1996

[54] DELIVERING AND FETCHING FONT INFORMATION

[75] Inventor: Chi S. Kam, Kowloon, Hong Kong

[73] Assignee: Digital Equipment Corporation, Maynard, Mass.

[21] Appl. No.: 146,387

[22] Filed: Nov. 1, 1993

[51] Int. Cl.$^6$ ................................................. G06K 15/00
[52] U.S. Cl. ............................ 395/110; 395/114; 395/115
[58] Field of Search ..................................... 395/110, 112, 395/114, 115, 116; 358/164–166, 404, 444, 261.4; 400/61, 62, 65, 67, 70, 72, 76

[56] References Cited

U.S. PATENT DOCUMENTS

| | | | |
|---|---|---|---|
| 4,594,674 | 6/1986 | Boulia et al. | 395/110 |
| 5,131,076 | 7/1992 | Yang et al. | 395/110 |
| 5,371,873 | 12/1994 | Niwa | 395/114 |

FOREIGN PATENT DOCUMENTS

| | | | |
|---|---|---|---|
| 0538059 | 4/1993 | WIPO | G06F 3/12 |
| 0562558 | 9/1993 | WIPO | G06K 15/00 |

*Primary Examiner*—Arthur G. Evans
*Attorney, Agent, or Firm*—Lindsay G. McGuinness; Denis G. Maloney; Arthur W. Fisher

[57] ABSTRACT

An output device is enabled to obtain character descriptions for use in raster scanning characters which belong to a common character font. Character descriptions are stored in an external device which is linked to the output device by a communication channel. Character codes are received at the output device which identify characters to be outputted. A raster image of the characters to be outputted is set up. In the course of setting up the raster image, information corresponding to the character codes is sent from the output device to the external device via the communication channel. In response to the character codes sent from the printer to the external device, corresponding character descriptions are sent from the external device to the output device via the communication channel.

13 Claims, 4 Drawing Sheets

DELIVERING AND FETCHING FONT INFORMATION

BACKGROUND OF THE INVENTION

This invention relates to delivering and fetching font information between a host computer and an output device, such as a printer.

Characters of one style are organized into fonts. Roman style fonts, such as Times-Roman (see Appendix A, which shows the Times-Roman character set) and Helvetica include relatively small numbers of characters (the Roman letters, the arabic numbers, and symbols). The amount of information needed to represent the characters of a Roman font is generally small enough to allow it to be stored within the memory of a conventional computer printer.

Other fonts, for example, fonts for Asian languages, typically include so many characters or symbols that complete font information cannot conveniently be stored at one time within the printer's internal memory.

One way to store the Asian font information is in an external hard disk connected to the printer.

Another known approach is to store the font information in the host computer and use it to deliver nonscalable bit map character glyphs from the computer to the printer, over a single communication channel, as needed.

SUMMARY OF THE INVENTION

In general, the invention features a method (and corresponding apparatus) which enables an output device, such as a printer, to obtain character descriptions for use in raster scanning characters which belong to a common character font. Character descriptions are stored in an external device that is linked to the output device by a communication channel (e.g., a secondary channel). Character codes are received at the output device that identify characters to be outputted. A raster image of the characters to be outputted is set up. In the course of setting up the raster image, information corresponding to the character codes is sent from the output device to the external device via the secondary communication channel. In response to the character codes sent from the output device to the external device, corresponding character descriptions are sent from the external device to the output device via the secondary communication channel.

Embodiments of the invention include the following features. The external device comprises a computer having mass storage. The character codes are sent to the output device via an independent communication channel (e.g., a main, or primary, communication channel). The main communication channel comprises either a parallel or a serial channel. The character codes received at the output device are embedded within page descriptions conforming to a graphical image description language (e.g., the PostScript® language). The common font comprises a font in an Asian language. The output device comprises a printer.

Among the advantages of the invention are the following.

Fonts having large numbers of characters (e.g., Asian fonts) can be stored in the existing disk drive, or other mass storage device, of the host computer and character descriptions can be delivered to the printer quickly over the existing secondary communication channel on demand. This makes it practical and inexpensive to handle such fonts without additional equipment.

Other advantages and features will become apparent from the following description and from the claims.

DESCRIPTION OF THE PREFERRED EMBODIMENT

The PostScript® language is useful for printing with raster output devices, e.g., laser printers, that represent a printed page as a rectangular array of pixels (picture elements). On a typical black-and-white output device, each pixel can be made either black or white; on certain devices, each pixel can be set to an intermediate shade of gray or to some color. By setting large groups of pixels to appropriate colors in appropriate combinations, one can produce an image that includes text and arbitrary graphical shapes.

A PostScript® language description of a page is created on a host computer. The page description includes a bit-encoding of the characters, lines, curves, and other images that are to be printed on a page. The encoding is at a relatively high level and expressed in terms of abstract graphical entities rather than in terms of device pixels. The page description is downloaded to a printer over a primary read/write communication channel as a bit stream.

To print characters on a page, the host computer informs the printer of the kind and style of characters to be printed. Typically, the information necessary to convert the bit stream into pixels is downloaded to the printer and stored in printer memory prior to downloading the page description bit stream. The printer uses the stored information to form and print the characters requested by the host computer.

Figure 1:
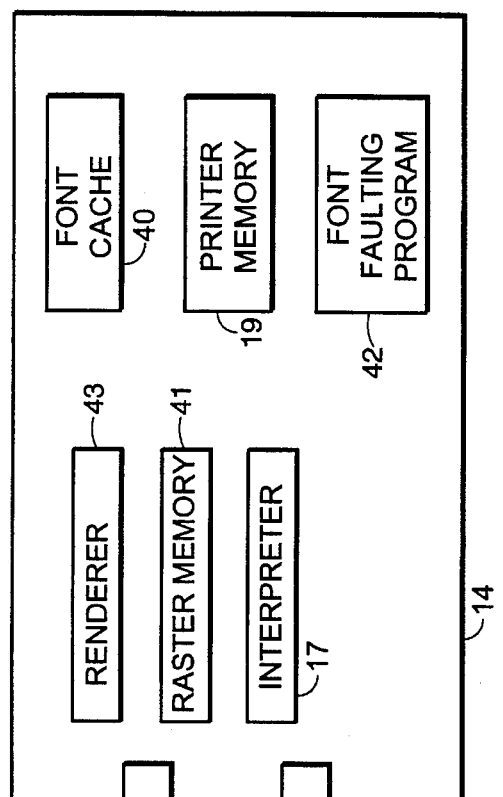
FIG. 1 is a block diagram of a host computer and a printer.

In FIG. 1, a page 10 of Asian characters 12 is generated by a PostScript® compatible laser printer 14 (e.g., DEClaser 1152 available from Digital Equipment Corporation of Maynard, Mass., U.S.A.) based on information passed from a host computer 16 (e.g., a VAX/VMS computer system) via primary and secondary communication channels 18, 20, respectively.

Computer 16 includes a microprocessor 22, an operating system 24, and an application program 26 which is able to generate PostScript® format page descriptions of pages to be printed. The page descriptions are sent to printer 14 on primary communication channel 18. The printer includes an interpreting microprocessor ("interpreter") 17 that responds to a page description by creating a pixel map in a raster memory 41 corresponding to the page to be printed. A print renderer 43 then renders the pixel representation on sheet 10 in a manner described in greater detail below.

The interpreter 17 executes the PostScript® language according to syntax rules that enable the interpreter to carry out the required operations in the proper order, as well as to fit the pieces of the page description together to produce the desired results.

The page description includes specialized bits, known as delimiters, which enable the interpreter 17 to organize the bit stream into groups of bits called objects. Some objects are ordinarily thought of as data, such as numbers, booleans, strings, and arrays. Other objects are ordinarily thought of as elements of programs to be executed, such as names, operators and procedures.

Figure 2:
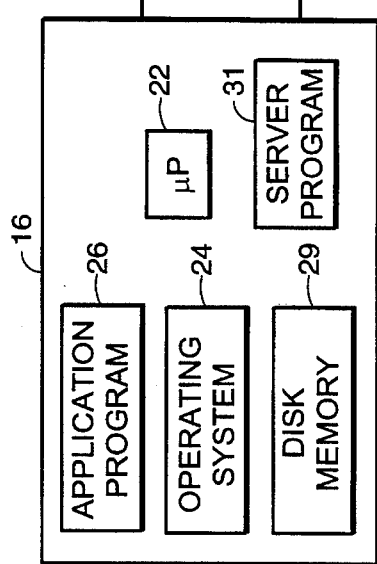
FIG. 2 is a block diagram of a portion of the printer memory.
Figure 2:
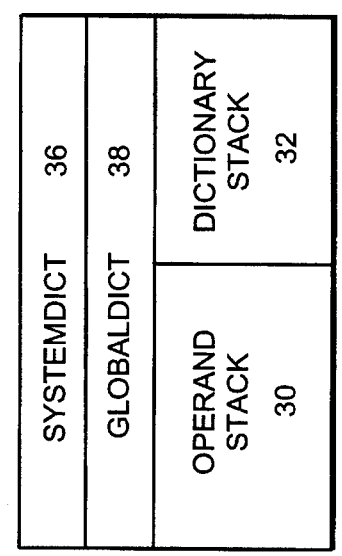

Objects are executed sequentially by the interpreter according to predetermined rules. The effect of executing a particular object depends on that object's type, attributes, and value. For example, number objects (signed integers, real numbers, and radix numbers) are executed by copying them into a section of printer memory 19 known as the operand stack 30 (FIG. 2). Executing a name object (any group of bits, not including delimiters, that cannot be interpreted as a number object) causes the interpreter to search for the name object in a section of printer memory known as the dictionary stack 32, that contains a list of pointers to different dictionaries, and to fetch and execute, from the appropriate dictionary (i.e., a block of printer memory 36), a value associated with the name object. Executing an array (otherwise known as a procedure), which consists of a group of objects, causes the objects in the array to be executed sequentially. Executing an operator object causes the interpreter to perform a built-in action, the rules of which are stored in printer memory under the associative names "SYSTEMDICT" 36 or "GLOBALDICT" 38. The built-in actions include adding two numbers or changing a section of raster memory.

Characters are organized in fonts (i.e., complete assortments of type of one style). A font for use with a PostScript® interpreter is prepared in the form of a PostScript® font program on the host computer. The font program is typically downloaded to the printer and executed by the interpreter to generate a font dictionary that is stored in the dictionary stack 32 of printer memory 19. In the page description characters are represented by coded sequences of bits. Appendix B shows an encoding scheme used in the PostScript® language.

There are different types of PostScript® fonts some of which allow programmers to specify a procedure named BuildChar to render a character. The procedure renders each character by fetching its corresponding character description from printer memory or some other source (e.g., a hard disk connected to the printer, a font cartridge, or a host computer) and raster-converts them into raster images (i.e., pixel representations) in raster memory 41.

Character descriptions can take a number of different forms. For example, the character descriptions may be PostScript® Type 1 charstrings (containing encoded lines and curves to construct the outline of a character; for a more detailed description see PostScript® Language Reference Manual Second Edition incorporated by reference). Other character descriptions may take the form of other data which the printer can use to construct a character (e.g., a PostScript® program or an encoded sequence of curves and lines). The character descriptions may also be bitmaps of the raster-converted characters (in which case, the printer would send a request to the host containing both the character code and the size of the bitmap, and the computer would rasterize the character and send the resulting bitmap to the printer).

All fonts (except those with a FontType of 0) are considered base fonts that contain individual character descriptions. Composite fonts are combinations of base fonts organized hierarchically. The font at the top level of the hierarchy is the root font. Fonts at a lower level of the hierarchy are called descendent fonts. The composite font facility supports the use of very large character sets, such as those for Asian languages. For more information see the Tutorial on Composite Fonts, available from the Adobe Systems Developers' Association, Adobe Systems Incorporated, of Mountain View, Calif., U.S.A., incorporated by reference.

The interpreter may temporarily store the results from executing a character description in font cache 40. The interpreter finds and reuses those stored results when the same character is to be printed again. The font cache is usually large enough to accommodate all of the distinct characters in a page description. Using the font cache is typically hundreds of times faster than again converting a character description each time the character is to be rendered.

In some instances the information representing the character descriptions of a font is too voluminous to be stored conveniently in printer memory 19, for example Asian fonts may contain more than 13,000 characters. The additional storage may be provided by attaching an auxiliary disk drive to the printer. In that scheme the Asian character descriptions are stored on the disk and only the indexes to the Asian character descriptions are loaded into printer memory. When a particular character description is needed by the interpreter, the interpreter may issue a file read request to retrieve the character description from the disk.

In the invention, to handle the information required to print large (e.g., Asian) fonts, the printer and the host communicate font information via the available secondary communication channel 20.

Figure 3:
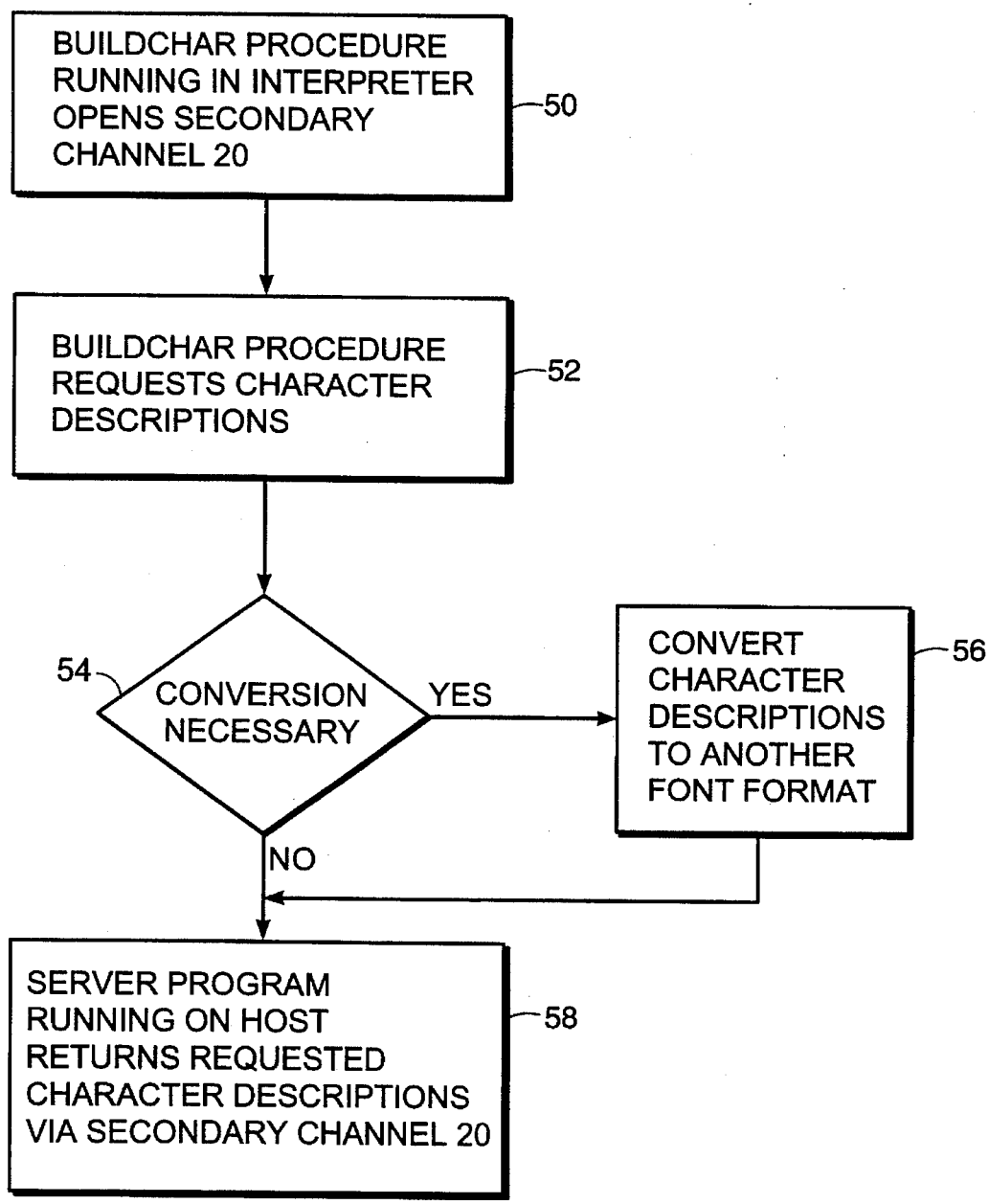
FIG. 3 is a flow diagram of an interaction between a printer and a host during a font faulting procedure.

A PostScript® client mode font faulting program 42 is downloaded to printer 14 via the primary communication channel 18 when the initial font information is loaded into printer memory (i.e., the appropriate BuildChar procedure for rendering the desired style of characters). As shown in FIG. 3, when the BuildChar procedure is called by the interpreter, it opens communication channel 20 between the printer and the host computer (50), which provides the printer with additional access to the character descriptions stored in disk memory 29 of the host computer (52). A server program 31, running on the host computer, returns the requested character descriptions to the printer (58). The character descriptions are pre-processed data stored in the memory of the host computer (e.g., character descriptions in Adobe Type 1 format). If necessary (54), the server program can also convert the character descriptions from other font formats before sending them to the printer (56). The character description in this form can be scalable outline descriptions or scan-converted bitmaps.

When an Asian font handled by the font faulting and server programs is invoked by a page description, instead of searching through the dictionary in printer memory for the character description associated with a character name, the interpreter may request the character description by name through the BuildChar procedure over the second communication channel 20. The server program responds by opening and reading from an appropriate character description data file, or converting from some other form of font data, and returning the description on channel 20. The interpreter converts the character description, in the usual way, into a pixel representation in raster memory.

Figure 4:
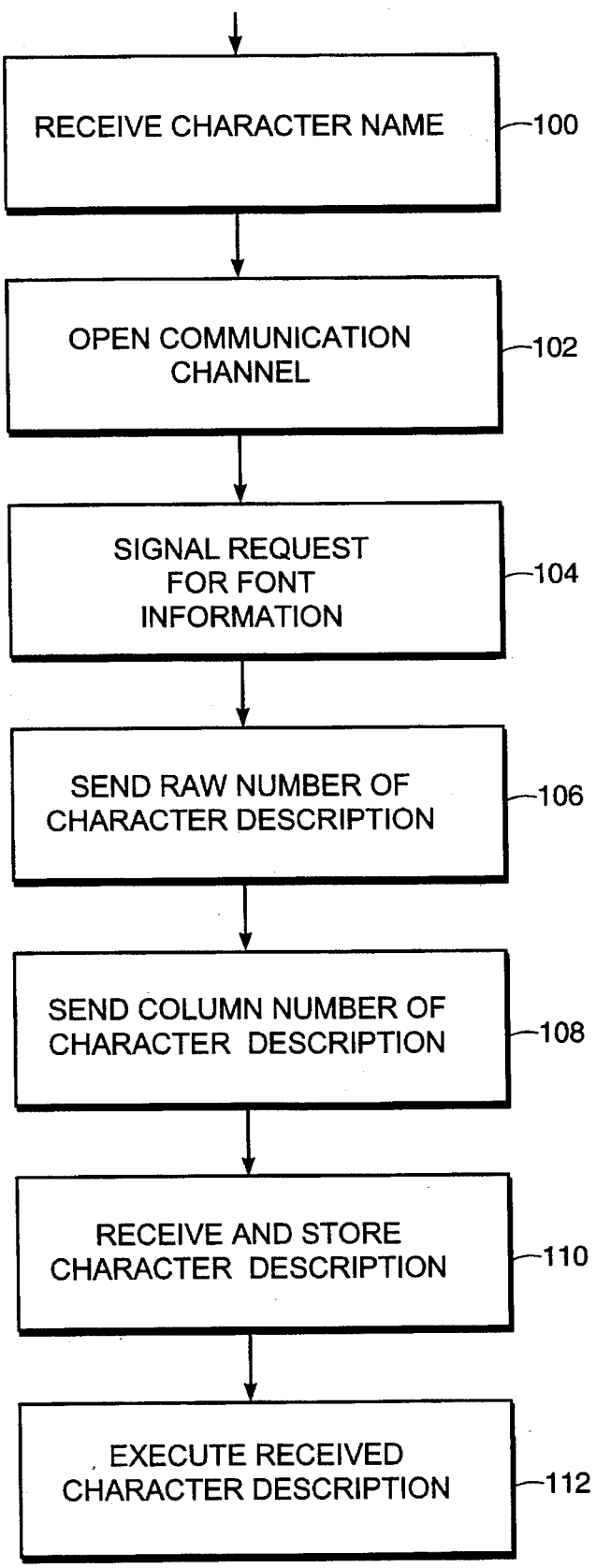
FIG. 4 is a flow diagram of a font faulting program running in a printer.

As shown in FIG. 4, the client mode font faulting program running in the interpreter of printer 16 may execute the following sequence of steps in order to choreograph the retrieval of character descriptions from the host computer. First the interpreter receives the character name from the page description bit stream downloaded by the host computer on communication channel 18 (100). The communication channel 20 is then opened as a write-only file (102). The characters ">CS" are written to communication channel 20 to signal a request for font information to the host computer (104). Next the last two characters of the character name are converted into hexadecimal notation and the converted characters are written to communication channel 20 to represent the row number of the encoded character description which is stored on the host computer (106). The two character code, associated with the character name, is then converted into hexadecimal notation and the converted code is written to communication channel 20 to represent the column number of the encoded character description which is stored on the host computer (108). The character stream representing the character description downloaded by the host computer on communication channel 20 is then read into the memory location associated with CSBUF until the End of File (EOF) indicator "~>" is received (110). Finally, the character description associated with CSBUF is executed by the interpreter as a conventional character description (112).

Appendix B, incorporated by reference, contains a PostScript® language version of the client mode program running in the printer.

Figure 5:
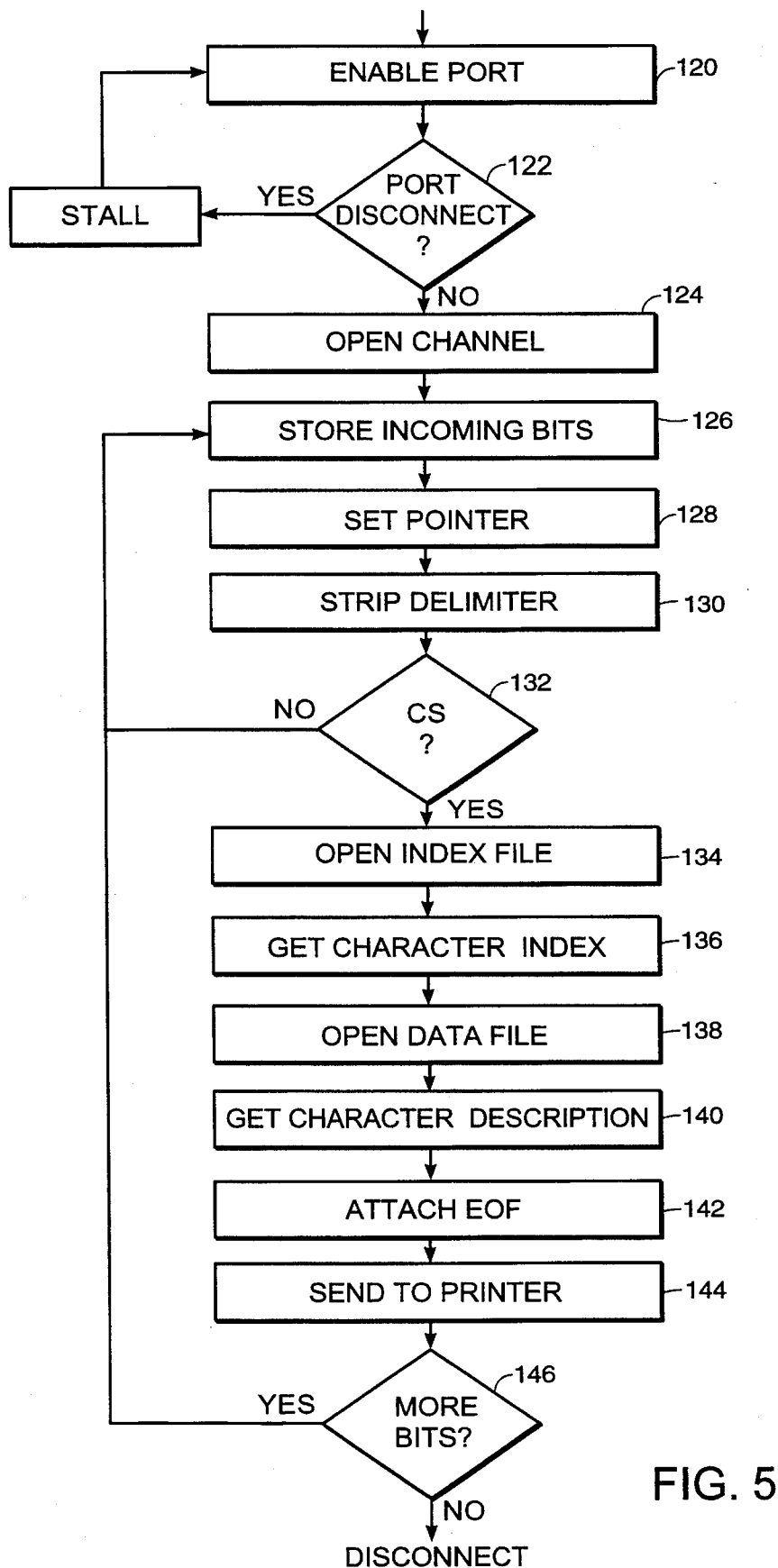
FIG. 5 is a flow diagram of a font faulting program running in a host computer.

As shown in FIG. 5, the server program running on the host computer may comprise the following steps. First, port 18 (FIG. 1) is enabled to be capable of read/write input/output (I/O) operations (120). If port 18 is disconnected within 1 second of an I/O operation, stall 1 second and go to step 1 (122). Next, channel 20 is opened (124). The incoming bit stream is then copied from channel 20 into a section of memory labeled MSGBUFFER (126). A pointer is then set to the first instance of ">" in MSGBUFFER (128). The delimiter "<" is stripped from character in MSG BUFFER, if present (130). If the first two characters in MSG BUFFER are "CS" then go to step 134, otherwise go to step 126 (132). The character description index file stored in disk memory 29 is then opened (134). The row and column information stored in MSGBUFFER are obtained as well as the index to the character description according the entry "index[row * 188+column]" (136). The character description data file is then opened (138). The retrieved index from the index file is used to obtain the requested character description from the character description data file and store it in CSBUF (140). The EOF delimiter "~>" is then attached to the end of the character description in CSBUF (142). The character description in CSBUF is downloaded to the printer (144). If additional bits are received on channel return to step 126; otherwise disconnect communication channel 20 (146).

Appendix C, incorporated by reference, contains a "C" language version of relevant portions of a server mode program running in the host computer.

Depending on how the BuildChar procedure is written, character descriptions can exist in several different forms. The invention is compatible with the following forms of character descriptions.

A PostScript® Type 1 charstring is an encrypted sequence of unsigned 8-bit bytes that encode integers and commands. It can be passed directly to PostScript®'s internal rasterizer (Type 1 rasterizer) to render a character. The BuildChar procedure sends a request containing the character code and font information to the host computer over the secondary communication channel. Then it opens the secondary channel for reading and waits for the charstring returned from the host. Upon receiving the request, the computer retrieves the charstring stored on the computer's disk memory and sends it back to the printer over the secondary communication channel. The BuildChar procedure receives the charstring and passes it to the Type 1 rasterizer for rendering the character. In addition to reading from the disk, the computer can also construct the charstring on-the-fly from other font formats (e.g., TrueType). For a detailed description of PostScript® Type 1 charstrings see Adobe type 1 Font Format Version 1.1 by Adobe Systems Incorporated.

A PostScript® Type 3 font defines character shapes using ordinary PostScript® language operators and procedures. To render a character, the BuildChar procedure executes PostScript® codes to construct the character's outline. Normally the PostScript® codes for rendering individual characters are stored in PostScript® dictionaries. However, in the invention, the BuildChar procedure is written to import the character-rendering PostScript® codes from an outside source. The BuildChar procedure of the font program sends a request to the host computer over the secondary communication channel. The request contains the character code and the font file information. Then it opens the secondary channel for reading and waits for the PostScript® code to be returned from the host computer. Upon receiving the request, the computer will construct the PostScript® character description and forward it to the printer over the secondary communication channel. The computer can construct the character-rendering PostScript® code by retrieving information stored on disk memory, or converting on-the-fly from another format. The BuildChar procedure receives the PostScript® code and passes it to the PostScript® interpreter for execution. For a detailed description of PostScript® Type 3 font programs see PostScript® Language Reference Manual, Second Edition, Adobe Systems Incorporated of Mountain View, Calif., U.S.A., incorporated by reference.

A Type 3 font program can render a character by using the PostScript® operator "imagemask" to paint a raster-converted bitmap to the printer's raster memory. The PostScript® operator imagemask paints a sampled image onto the current page using the current color. The sampled image is a rectangular array of 1-bit samples that are used to control where to apply paint with the current color and where not to apply paint. To render a character according to the invention, the BuildChar procedure of the font program sends a request to the host computer over the secondary communication channel. The request contains the character code, the font name and typeface, and the size of the bitmap to be provided by the host computer. The BuildChar procedure then opens the secondary channel for reading and waits for the bitmap to be forwarded from the host. Upon receiving the request the computer will set up a block of memory and call its graphics routines to draw the character into memory in the requested size. The computer formats the bitmap in a suitable PostScript® format and forwards the data to the printer over the secondary communication channel. The BuildChar procedure receives the bitmap data, stores it in a string and calls the imagemask operator to render the character.

Other embodiments are within the scope of the claims. For example, the invention can be used with any raster output device having two or more read/write communication ports, and is not restricted to PostScript® printers.

Appendix A
Standard Roman Character Set

ABCDEFGHIJKLMNOPQRSTUVWXYZ
abcdefghijklmnopqrstuvwxyz&0123456789
ÆÁÂÄÀÅÃÇÐÉÊËÈÍÎÏÌŁÑŒÓÔÖÒÕØŠÞÚ
ÛÜÙŸÝŽæáâäàåãçéêëèðﬁﬂíîïìıµłñœóôöòõøšþß
úûüùÿýž£¥ƒ$¢¤™©®@ªº†‡§¶*!¡?¿.,;:''""„…'"
‹›«»()[]{}|/\-–—_.,´^¨`˙•~˘¸ˇ¯•
%‰¼¾½=−+×~<±>÷¬°∧/.¦¹²³

Appendix B

PostScript® Program

```
    %!
    true 0 startjob pop
5   14 dict begin
    /FontName /NotDefFont def
    /PaintType 0 def
    /WMode 0 def
    /FontType 1 def
10  /FontMatrix [0.001 0 0 0.001 0 0] readonly def
    /FontBBox [0 -140 1000 860] readonly def
    /UniqueID 9712499 def
    /Private 10 dict dup begin /BlueValues [] def
15  /StdHW [24] def
    /StdVW [48] def
    /ForceBold false def
    /LanguageGroup 1 def
    /RndStemUp false def
20  /lenIV 4 def
    /MinFeature {16 16} def
    /password 5839 def
end def
1 dict dup /.notdef  <10BF317079CA 388FE0> put /CharStrings exch def
256 array 0 1 255 {1 index exch /.notdef put} for /Encoding exch def
currentdict end dup /FontName get exch definefont pop /DECCNSDict 12 dict def
DECCNSDict begin
```

```
/notdefstr <10BF317079CA388FE0> def
/csbuf 1500 string def

/DSLCCharString 189 dict dup begin
        /.notdef 0 def
 5      /c21 16#01 def  /c22 16#02 def  /c23 16#03 def  /c24 16#04 def
        /c25 16#05 def
        /c26 16#06 def  /c27 16#07 def  /c28 16#08 def  /c29 16#09 def
        /c2A 16#0A def
        /c2B 16#0B def  /c2C 16#0C def  /c2D 16#0D def  /c2E 16#0E def
10      /c2F 16#0F def
        /c30 16#10 def
        /c31 16#11 def  /c32 16#12 def  /c33 16#13 def  /c34 16#14 def
        /c35 16#15 def
        /c36 16#16 def  /c37 16#17 def  /c38 16#18 def  /c39 16#19 def
15      /c3A 16#1A def
        /c3B 16#1B def  /c3C 16#1C def  /c3D 16#1D def  /c3E 16#1E def
        /c3F 16#1F def
        /c40 16#20 def
        /c41 16#21 def  /c42 16#22 def  /c43 16#23 def  /c44 16#24 def
20      /c45 16#25 def
        /c46 16#26 def  /c47 16#27 def  /c48 16#28 def  /c49 16#29 def
        /c4A 16#2A def
        /c4B 16#2B def  /c4C 16#2C def  /c4D 16#2D def  /c4E 16#2E def
        /c4F 16#2F def
25      /c50 16#30 def
        /c51 16#31 def  /c52 16#32 def  /c53 16#33 def  /c54 16#34 def
        /c55 16#35 def
        /c56 16#36 def  /c57 16#37 def  /c58 16#38 def  /c59 16#39 def
        /c5A 16#3A def
30      /c5B 16#3B def  /c5C 16#3C def  /c5D 16#3D def  /c5E 16#3E def
        /c5F 16#3F def
```

```
/c60 16#40 def
/c61 16#41 def  /c62 16#42 def  /c63 16#43 def  /c64 16#44 def
/c65 16#45 def /c66 16#46 def  /c67 16#47 def  /c68 16#48 def  /c69 16#49 def
/c6A 16#4A def
/c6B 16#4B def  /c6C 16#4C def  /c6D 16#4D def  /c6E 16#4E def
/c6F 16#4F def
/c70 16#50 def
/c71 16#51 def  /c72 16#52 def  /c73 16#53 def  /c74 16#54 def
/c75 16#55 def
/c76 16#56 def  /c77 16#57 def  /c78 16#58 def  /c79 16#59 def
/c7A 16#5A def
/c7B 16#5B def  /c7C 16#5C def  /c7D 16#5D def  /c7E 16#5E def /cA1 16#61 def  /cA2 16#62 def  /cA3 16#63 def  /cA4 16#64 def
/cA5 16#65 def
/cA6 16#66 def  /cA7 16#67 def  /cA8 16#68 def  /cA9 16#69 def
/cAA 16#6A def
/cAB 16#6B def  /cAC 16#6C def  /cAD 16#6D def  /cAE 16#6E def
/cAF 16#6F def
/cB0 16#70 def
/cB1 16#71 def  /cB2 16#72 def  /cB3 16#73 def  /cB4 16#74 def
/cB5 16#75 def
/cB6 16#76 def  /cB7 16#77 def  /cB8 16#78 def  /cB9 16#79 def
/cBA 16#7A def
/cBB 16#7B def  /cBC 16#7C def  /cBD 16#7D def  /cBE 16#7E def
/cBF 16#7F def
/cC0 16#80 def
/cC1 16#81 def  /cC2 16#82 def  /cC3 16#83 def  /cC4 16#84 def
/cC5 16#85 def
```

```
/cC6 16#86 def /cC7 16#87 def /cC8 16#88 def /cC9 16#89 def
/cCA 16#8A def
/cCB 16#8B def /cCC 16#8C def /cCD 16#8D def /cCE 16#8E def
/cCF 16#8F def
/cD0 16#90 def /cD1 16#91 def /cD2 16#92 def /cD3 16#93 def /cD4 16#94 def
/cD5 16#95 def
/cD6 16#96 def /cD7 16#97 def /cD8 16#98 def /cD9 16#99 def
/cDA 16#9A def
/cDB 16#9B def /cDC 16#9C def /cDD 16#9D def /cDE 16#9E def
/cDF 16#9F def
/cE0 16#A0 def
/cE1 16#A1 def /cE2 16#A2 def /cE3 16#A3 def /cE4 16#A4 def
/cE5 16#A5 def
/cE6 16#A6 def /cE7 16#A7 def /cE8 16#A8 def /cE9 16#A9 def
/cEA 16#AA def
/cEB 16#AB def /cEC 16#AC def /cED 16#AD def /cEE 16#AE def
/cEF 16#AF def
/cF0 16#B0 def
/cF1 16#B1 def /cF2 16#B2 def /cF3 16#B3 def /cF4 16#B4 def
/cF5 16#B5 def
/cF6 16#B6 def /cF7 16#B7 def /cF8 16#B8 def /cF9 16#B9 def
/cFA 16#BA def
/cFB 16#BB def /cFC 16#BC def /cFD 16#BD def /cFE 16#BE def
end def /DSLCVec 256 array dup 0 1 255 {/.notdef put dup } for pop
                 dup 16#21 /c21 put dup 16#22 /c22 put dup
      16#23 /c23 put
   dup 16#24 /c24 put dup 16#25 /c25 put dup 16#26 /c26 put dup
      16#27 /c27 put
```

```
dup 16#28 /c28 put dup 16#29 /c29 put dup 16#2A /c2A put dup
16#2B /c2B put
dup 16#2C /c2C put dup 16#2D /c2D put dup 16#2E /c2D put dup
16#2F /c2F put
dup 16#30 /c30 put dup 16#31 /c31 put dup 16#32 /c32 put dup
16#33 /c33 put
dup 16#34 /c34 put dup 16#35 /c35 put dup 16#36 /c36 put dup
16#37 /c37 put
dup 16#38 /c38 put dup 16#39 /c39 put dup 16#3A /c3A put dup
16#3B /c3B put
dup 16#3C /c3C put dup 16#3D /c3D put dup 16#3E /c3E put dup
16#3F /c3F put dup 16#40 /c40 put dup 16#41 /c41 put dup 16#42 /c42 put dup
16#43 /c43 put
dup 16#44 /c44 put dup 16#45 /c45 put dup 16#46 /c46 put dup
16#47 /c47 put
dup 16#48 /c48 put dup 16#49 /c49 put dup 16#4A /c4A put dup
16#4B /c4B put
dup 16#4C /c4C put dup 16#4D /c4D put dup 16#4E /c4E put dup
16#4F /c4F put dup 16#50 /c50 put dup 16#51 /c51 put dup 16#52 /c52 put dup
16#53 /c53 put
dup 16#54 /c54 put dup 16#55 /c55 put dup 16#56 /c56 put dup
16#57 /c57 put
dup 16#58 /c58 put dup 16#59 /c59 put dup 16#5A /c5A put dup
16#5B /c5B put
dup 16#5C /c5C put dup 16#5D /c5D put dup 16#5E /c5E put dup
16#5F /c5F put dup 16#60 /c60 put dup 16#61 /c61 put dup 16#62 /c62 put dup
16#63 /c63 put
```

```
dup 16#64 /c64 put dup 16#65 /c65 put dup 16#66 /c66 put dup
16#67 /c67 put
dup 16#68 /c68 put dup 16#69 /c69 put dup 16#6A /c6A put dup
16#6B /c6B put
dup 16#6C /c6C put dup 16#6D /c6D put dup 16#6E /c6E put dup
16#6F /c6F put dup 16#70 /c70 put dup 16#71 /c71 put dup 16#72 /c72 put dup
16#73 /c73 put
dup 16#74 /c74 put dup 16#75 /c75 put dup 16#76 /c76 put dup
16#77 /c77 put
dup 16#78 /c78 put dup 16#79 /c79 put dup 16#7A /c7A put dup
16#7B /c7B put
dup 16#7C /c7C put dup 16#7D /c7D put dup 16#7E /c7E put dup 16#A1 /cA1 put dup 16#A2 /cA2 put dup
16#A3 /cA3 put
dup 16#A4 /cA4 put dup 16#A5 /cA5 put dup 16#A6 /cA6 put dup
16#A7 /cA7 put
dup 16#A8 /cA8 put dup 16#A9 /cA9 put dup 16#AA /cAA put dup
16#AB /cAB put
dup 16#AC /cAC put dup 16#AD /cAD put dup 16#AE /cAE put dup
16#AF /cAF put dup 16#B0 /cB0 put dup 16#B1 /cB1 put dup 16#B2 /cB2 put dup
16#B3 /cB3 put
dup 16#B4 /cB4 put dup 16#B5 /cB5 put dup 16#B6 /cB6 put dup
16#B7 /cB7 put
dup 16#B8 /cB8 put dup 16#B9 /cB9 put dup 16#BA /cBA put dup
16#BB /cBB put
dup 16#BC /cBC put dup 16#BD /cBD put dup 16#BE /cBE put dup
16#BF /cBF put
``` dup 16#C0 /cC0 put dup 16#C1 /cC1 put dup 16#C2 /cC2 put dup
16#C3 /cC3 put
dup 16#C4 /cC4 put dup 16#C5 /cC5 put dup 16#C6 /cC6 put dup
16#C7 /cC7 put
dup 16#C8 /cC8 put dup 16#C9 /cC9 put dup 16#CA /cCA put dup
16#CB /cCB put dup 16#CC /cCC put dup 16#CD /cCD put dup 16#CE /cCE put dup
16#CF /cCF put dup 16#D0 /cD0 put dup 16#D1 /cD1 put dup 16#D2 /cD2 put dup
16#D3 /cD3 put
dup 16#D4 /cD4 put dup 16#D5 /cD5 ptu dup 16#D6 /cD6 put dup
16#D7 /cD7 put
dup 16#D8 /cD8 put dup 16#D9 /cD9 put dup 16#DA /cDA put dup
16#DB /cDB put
dup 16#DC /cDC put dup 16#DD /cDD put dup 16#DE /cDE ptu dup
16#DF /cDF put dup 16#E0 /cE0 put dup 16#E1 /cE1 put dup 16#E2 /cE2 put dup
16#E3 /cE3 put
dup 16#E4 /cE4 put dup 16#E5 /cE5 put dup 16#E6 /cE6 put dup
16#E7 /cE7 put
dup 16#E8 /cE8 put dup 16#E9 /cE9 put dup 16#EA /cEA put dup
16#EB /cEB put
dup 16#EC /cEC put dup 16#ED /cED put dup 16#EE /cEE put dup
16#EF /cEF put dup 16#F0 /cF0 put dup 16#F1 /cF1 put dup 16#F2 /cF2 put dup
16#F2 /cF3 put
dup 16#F4 /cF4 put dup 16#F5 /cF5 put dup 16#F6 /cF6 put dup
16#F7 /cF7 put

```
        dup 16#F8 /cF8 put dup 16#F9 /cF9 put dup 16#FA /cFA put dup
        16#FB /cFB put
        dup 16#FC /cFC put dup 16#FD /cFD put dup 16#FE /cFE put
def /pd 0 def /fd 0 def
        /Subrs [ <10bf3170f9> readonly <10bf3170f9> readonly
        <10bf3170f9> readonly
                <10bf3170f9> readonly ] readonly def /tmplFontName (DECSungLightCNST4rr) def
        /CO <000000000000000000000000> def
        /PGFA [(Dummy1.dat)] def % This is the routine which sends a request to host to
        obtain the character
        % outline description.  Parameters passed to it are
        character code and font
        % dictionary /bc {
                % charstring fault request : ^>CSA1A1<
                userdict /SerBout known {
                    userdict /SerBOut get
                }{                      % first time in BuildChar for th
        is job
                    userdict /SerBIn format
                put             % store it for later quicker ref
```

```
erence     (%SerialB%) (w) file
        userdict /SerBOut 2 index put      % same for output
channel
        } ifelse % a copy of
SerBOut on the stack
        dup (^>CS) writestring             % CS for
charstring fault dup 3 index /FontName get dup length  % the last 2
characters in
        2 sub 2 getinterval writestring    % font name = row
number in hex dup                                        % file handle for
Serial B 2 index                            % character code
        16 (   </r) dup 4 1 roll cvrs pop  % convert to hex
digits
        writestring
        flushfile userdict /SerBIn get
        DECCNSDict /csbuf get              %string buffer
for charstring dup length 0 eq {                  % length=0 =>
undefined character
rs
            opo DECCNSDict /notdefstr get
    } if
```

```
        cvx                              % pass the
executable string to
CCRun
        //systemdict /internaldict get 1183615869 exch exec
/CCRun get exec
    } def
end % Definition of all base fonts
%
16#A1 1 16#FE {
  19 dict begin
        dup 6012540 add /Unique ID exch def
        DECCNSDict /tmplFontName get dup length string copy
        dup dup length 2 sub 2 getinterval 3 -1 roll exch 16
exch cvrs
        pop
        /FontName exch def
        /FontInfo 4 dict dup begin /Weight (Medium readonly def
        /isFixedPitch true def
        /UnderlinePosition -133 def
        /UnderlineThickness 20 def
end def
/PaintType 0 def
/FontType 4 def
/FontType 4 def
 DECCNSDict dup /CO get
/CharOffsets exch def dup /DSLCCharString get
/CharStrings exch def /PGFA get
/PGFArray exch def
```

```
            /CDevProc {pop pop pop pop 0 exch -1000 exch 2 div 860 } def
            /Encoding DECCNSDict /DSLCVec get def
            /FontBBox [0 -140 1000 860] def
            currentdict
end
dup /BuildChar DECCNSDict /bc get bind executeonly put
dup /UniqueID get 1 index /Private 11 dict dup begin
                    /password 5839 def
                    /UniqueID 5 -1 roll def
                    /BlueValues [] def
                    /StdHW [24] def
                    /StdVW [48] def
                    /ForceBold false def
                    /MinFeature {16, 16} def
                    /LanguageGroup 1 def
                    /RndStmUp false def
                    /Subrs DECCNSDict /Subrs get def
              end noaccess put
                    dup /FontName get exch definefont pop
} for
12 dict begin
/FontInfo 8 dict dup begin
        /version (001.001) readonly def
        /FullName (NotDefCompFont) readonly def /FamilyName (NotDefCompFont) readonly def
        /Weight (Medium) readonly def
        /ItalicAngle 0 def
        /isFixedPitch true def
```

```
        /UnderlinePosition -215 def
        /UnderlineThickness 50 def
end readonly def
/FontName /NotDefCompFont def
/FontType 0 def
/FontMatrix matrix def
/FMapType 2 def
/Encoding 256 array 0 1 255 { 1 index exch 0 put } for readonly def
/FDepVector 69 array 0 1 68 { 1 index exch /NotDefFont findfont put }
        for def
/PrefEnc /DECSungLightCNST4C4 findfont /Encoding get def
WMode 0 def
currentdict
end
dup /FontName get exch definefont pop 12 dict begin
        /FontInfo 8 dict dup begin
        /version (001.001) readonly def
        /FullName (Sung-Light-CNS11643-HV) readonly def
        /FamilyName (Sung-Light-CNS11643-HV) readonly def
        /Weight (Medium) readonly def
        /ItalicAngle 0 def
        /isFixedPitch true def
        /UnderlinePosition -215 def
        /UnderlineThickness 50 def
end readonly def
/FontName /Sung-Light-CNS11643-HV def
/FontType 0 def
/FontMatrix matrix def
/FMapType 2 def
/Encoding 256 array 0 1 92 { 1 index exch dup 1 add put } for
```

```
                              93 1 255 { 1 index exch 0 put } for
                              readonly def
/FDepVector   [ /NotDefFont    findfont /DECSungLightCNST4A1
      findfont /DECSungLightCNST4A2 findfont
/DECSungLightCNST4A3 findfont
                   /DECSungLightCNST4A4 findfont
/DECSungLightCNST4A5 findfont
                   /DECSungLightCNST4A6 findfont
/DECSungLightCNST4A7 findfont
                   /DECSungLightCNST4A8 findfont
/DECSungLightCNST4A9 findfont
                   /DECSungLightCNST4AA findfont
/DECSungLightCNST4AB findfont
                   /DECSungLightCNST4AC findfont
/DECSungLightCNST4AD findfont
                   /DECSungLightCNST4AE findfont
/DECSungLightCNST4AF findfont
                   /DECSungLightCNST4B0 findfont
/DECSungLightCNST4B1 findfont
                   /DECSungLightCNST4B2 findfont
/DECSungLightCNST4B3 findfont
                   /DECSungLightCNST4B4 findfont
/DECSungLightCNST4B5 findfont
                   /DECSungLightCNST4B6 findfont
/DECSungLightCNST4B7 findfont
                   /DECSungLightCNST4B8 findfont
/DECSungLightCNST4B9 findfont
                   /DECSungLightCNST4BA findfont
/DECSungLightCNST4BB findfont
```

```
                /DECSungLightCNST4BC findfont
/DECSungLightCNST4BD findfont
                /DECSungLightCNST4BE findfont
/DECSungLightCNST4BF findfont
                /DECSungLightCNST4C0 findfont
/DECSungLightCNST4C1 findfont
                /DECSungLightCNST4C2 findfont
/DECSungLightCNST4C3 findfont
                /DECSungLightCNST4C4 findfont
/DECSungLightCNST4C5 findfont
                /DECSungLightCNST4C6 findfont
/DECSungLightCNST4C7 findfont
                /DECSungLightCNST4C8 findfont
/DECSungLightCNST4C9 findfont
                /DECSungLightCNST4CA findfont
/DECSungLightCNST4CB findfont
                /DECSungLightCNST4CC findfont
/DECSungLightCNST4CD findfont
                /DECSungLightCNST4CE findfont
/DECSungLightCNST4CF findfont
                /DECSungLightCNST4D0 findfont
/DECSungLightCNST4D1 findfont
                /DECSungLightCNST4D2 findfont
/DECSungLightCNST4D3 findfont
                /DECSungLightCNST4D4 findfont
/DECSungLightCNST4D5 findfont
                /DECSungLightCNST4D6 findfont
/DECSungLightCNST4D7 findfont
                /DECSungLightCNST4D8 findfont
/DECSungLightCNST4D9 findfont
                /DECSungLightCNST4DA findfont
/DECSungLightCNST4DB findfont
```

```
        /DECSungLightCNST4DC findfont
/DECSungLightCNST4DD findfont
        /DECSungLightCNST4DE findfont
/DECSungLightCNST4DF findfont
        /DECSungLightCNST4E0 findfont
/DECSungLightCNST4E1 findfont
        /DECSungLightCNST4E2 findfont
/DECSungLightCNST4E3 findfont
        /DECSungLightCNST4E4 findfont
/DECSungLightCNST4E5 findfont
        /DECSungLightCNST4E6 findfont
/DECSungLightCNST4E7 findfont
        /DECSungLightCNST4E8 findfont
/DECSungLightCNST4E9 findfont
        /DECSungLightCNST4EA findfont
/DECSungLightCNST4EB findfont
        /DECSungLightCNST4EC findfont
/DECSungLightCNST4ED findfont
        /DECSungLightCNST4EE findfont
/DECSungLightCNST4EF findfont
        /DECSungLightCNST4F0 findfont
/DECSungLightCNST4F1 findfont
        /DECSungLightCNST4F2 findfont
/DECSungLightCNST4F3 findfont
        /DECSungLightCNST4F4 findfont
/DECSungLightCNST4F5 findfont
        /DECSungLightCNST4F6 findfont
/DECSungLightCNST4F7 findfont
        /DECSungLightCNST4F8 findfont
/DECSungLightCNST4F9 findfont
        /DECSungLightCNST4FA findfont
/DECSungLightCNST4FB findfont
```

```
            /DECSungLightCNST4FC findfont
/DECSungLightCNST4FD findfont
        /NOTDefFont findfont  ] def
        /PrefEnd DECSungLightCNST4C4 findfont /Encoding
        get def
        WMode 0 def
        currentdict end
        dup /FontName get exch definefont pop 14 dict begin
        /FontInfo 8 dict dup begin
/version (001.001) readonly def
/FullName (Sung-Light-CNS11643) readonly def
/FamilyName (Sung-Light-CNS11643) readonly def

46612.B11
```

Appendix C
"C" Program

```c
/* hex_to_bin   convert two hexadecimal digits to a binary byte */
unsigned char hex_to_bin(p)
unsigned char *p;
{
    unsigned char i, x, y, *po;
    y = 0;
    po = p;
    for (i=o; i<2; i++) {
        if ((*p >= '0') && (*p <= '9'))
            x = (*p) - '0';
        else if ((*p >= 'a') && (*p <= 'f'))
            x = (*p) - 'a' + 10;
        else if ((*p >= 'A') && (*p <= 'F'))

x = (*p) - 'A' + 10'
        else {
            printf("Invalid Hex Data
            Encountered,data=%c%c\n",*po,*(po+1));
            exit(1);

}
        p++;
        y = (y << 4) + x;
    }
    return(y);
}
```

```c
/*
    This is for the charstring faulting of Type 4 Asian
fonts
*/
handle_charstring_request(code)
char *code;
{ static int cs_index[17673];
        unsigned char cs_bug[1500];
        FILE *fp_idx;
        unsigned int x;
        int  i,j,cs_len,row,col,entry;

if (fp_cs==NULL)     {    /* charstring file open yet ? */ fp_idx = fopen("CNSSungASC85.idx","r");
        if (fp_idx==NULL)  {
            printf("CharString index file open error !\n");
            return(0);
        }
        for (i=0;i<=17672;i++) { /* get indexes for all
                                    character's charstring *
                                 /* each entry is 3-byte in
                                    length and contains
          for (j=0;j<3;j++)      /* offsets of charstring in
                                    CNSSungASC85.dat */
            x = (x << 8) + fgetc(fp_idx);
            cs_index[i] = x;
        }
```

```
file */
            if (fp_cs==NULL) {
                printf("CharString data file open error
                !\n"); return (0);
            }
        } row = hex_to_bin(code);
        col = hex_to_bin(code+2);
        printf("Fault in character %c%c%c%c
%c%c\n",*code,*(code+1),*(code+2),*(code+3),row,col);
        row -= 0xa1;
        if (col > 0x80)
            col = col - 0xa1 + 94;
        else
            col -= 0x21;
        entry = row * 188 + col;
        fseek(fp_cs,cs_index[entry],SEEK_SET); /* read the
charstring from disk file
*/
        cs_len = cs_index[entry+1] - cs_index[entry]; /*
length of charstring */ if (cs_len > 0) {
            i = cs_len;
            j = 0;
            while (i > 512) { /* charstring file contains
512 byte fix records */
                fread(cs_buf+j,512,1,fp_cs);
            j+=512;
            i-=512;
```

```
                fseek(fp_cs,cs_index[entry]+j,SEEK_SET);
        }
        fread(cs_buf+j,i,1,fp_cs);
}
cs_buf[cs_len] ]'~';  /* delimiter for ASC1185 filter */
cs_buf[cs_len+1]='>';
```

```
        status = sys$qiow (___, lt_chan, IO$_WRITEVBLK,
                          iosb_w, ___, ___,
                          cs_buf, cs_len+2, ___, ___, ___,
___);
        check_status (status, "$QIOW");
        check_io_status (iosb_w[0], "IO$_WRITEVBLK", NULL);

return(1);
}

/*
        all requests received start with ^> are processed
here

CSrrcc         individual charstring of Asian Type 4
                           fonts, rr=row, cc=column
            FNfontname     PostScript® font fault request,
                           fontname = name of PS font
            NFfontname     Another findfont request received
                           while sending a font to printe
r
            FC             Font fault completed
*/ process_res_fault_request(buf)
char *buf;
{
        char *p;
        printer_ready = 1;
```

```
        p = strstr(buf,"<");   /* look for end delimiter */
        if (p==NULL)
                return(1);      /* neglect it if not found */
        *p = 0;                 /* otherwise strip it from
buffer */
        if (*(buf+2)=='C' && *(buf+3)=='S')   {
                handle_charstring_request(buf+4);
        }
} int read_ast (astprm, r0, r1, pc, psl)
int astprm;                     /* AST parameter    */
int r0;                         /* Saved R0         */
int r1;                         /* Saved R1         */
int pc;                         /* Saved PC         */
int psl;                        /* Saved PSL        */
```

```
{
    char *p,*q;

printf("read_ast entered, status = %x\n",iosb_r[0]);

if ((iosb_r[0] & 1) && iosb_r[0] !=SS$_ABORT &&
iosb_r[0] != SS$_CANCEL ) {
        q = ast_buffer;
        while (q < (q+iosb_r[1]) && *q < ' ') q++; /*
skip the leading zeroes, ctrl-d */
        ast_buffer[iosb_r[1]] = 0;
        printf("read ast completed, buffer = %s\n",q);
    p = msg_buffer;               /* copy to another
buffer */
    while (*p++ = *q++);
    if (msg_buffer[0]=='!' && msg_buffer[1] == '>')
        process_unsolicited_msg(msg_buffer);
    else {
        sys$setef(2);
        sys$setef(1);             /* wake up the main
loop */
    }                             /* message is in
msg_buffer */
}

/* re-establish the next AST read procedure */ status - sts$qio (___, lt_chan, IO$_READVBLK,
                            iosb_r,read_ast, 0,
                            ast_buffer, 512, ___,
&terminator_mask, ___, ___);
    if (!(status & 1))
```

```
                exit(status);

} process_ps_status_messages(p)
char *p;
{
} main ()

{
        int i;
        char *dev_desc[2] = {8, "LAT_PORT"}, *p;
```

```
        static $DESCRIPTOR(delta_time,"0 ::5");    /* 5 seconds timer */
/*
 * Assign a channel to the device.
 */
        status - sts$assign (dev_desc, <_chan, ___, ___);
        check_status (status, "$ASSIGN");

/*
 * Enable the control-Y AST.  If the control-Y AST is enabled
 *      after connecting to the port, a window of time may exist where
 *      we will not be notified of a hang-up.  Therefore, we enable
 *      the AST prior to the connect.  SS$_DEVOFFLINE may be returned
 *      if the port was disconnected within one second of attempting
 *      another I/O operation.  Note that the documentation states
 *      that SS$_DEACTIVE is returned, but we have always seen
 *      SS$_DEVOFFLINE returned.  If this error is returned, we stall
 *      for one second and retry the I/O operation.
/*
        for (;;)
        {
            status = sys$qiow (___, lt_chan, IO$_SETMODE|IO$M_CTRLYAST,
                    iosb_w, ___, ___,
                    ctrly_ast, SS$_CONTROLY, ___, ___, ___,
                    ___);
            if (status == SS$_DEVOFFLINE)
            {
                printf (" ... waiting for device to go online\n");
```

```
                lib$wait (&1.0); /* Stall one second if
device is offline */
        }
        else
            break;
    }
    check_status (status, "$QIOW");
    check_io_status (iosb_w[0],
"IO$_SETMODE|IO$M_CTRLYAST", NULL);
/*

* Connect a LAT session to the server port.
 8/
    status = sys$QIOW (___, lt_chan,
IO$_TTY_PORT|IO$M_LT_CONNECT,
        iosb_w, ___, ___,
        ___, ___, ___, ___, ___, ___);
    check_status (status, "SQIOW");
    check_io_status (iosb_w[0],
"IO$_TTY_PORT|IO$M_LT_CONNECT",
        reject_reason_codes[iosb_w[1]]);

/*
 * Get the port mapping information. This is an
undocumented and   * unsupported function. It returns the
port and server names in   * two consecutive counted ASCII
strings. For example, if the      * LAT port is on server
DSV001, port MY_PORT, the buffer will be   * returned as:
 *
 *          "\007MY_PORT\006DSV001"
 *
 */
```

```
            char buffer[128];   /* Buffer to receive port
info */
            char port_name[64];    /* Holds port name*/
            char server_name[64];  /* Holds server name*/
/*
 *      Clear buffer which will receive the port
information.
 */
            memset (buffer, 0, 128);

status = sys$qiow (___, lt_chan,
IO$_TTY_PORT|IO$M_LT_READPORT,
                      iosb_r, ___, ___,
                      buffer, 128, ___, ___, ___, ___);
            check_status (status, "$QIOW");
            check_io_status (iosb_r[0],
"IO$_TTY_PORT|IO$M_LT_READPORT", NULL);
/*
 *      Extract the server and port names.
 */
            memset (port_name, 0, 64);    /* Clear strings
to receive */
            memset (server_name, 0, 64);  /* server and
port names   */
            strncpy (port_name, buffer+1, buffer[0]);

strncpy (server_name, buffer+buffer[0]+1,
*(buffer+buffer[0]));
/*
 *      Display the port information.
 */
```

```
        printf ("Port mapping - Server: %s   Port: %s
<%s>\n", server_name,
            port_name, iosb_r[2] == 1 ? "interactive" :
                       iosb_r[2] == 2 ? "applications" :
"bad port type");
} status = sys$qio (___, lt_chan, IO$_READVBLK,
                          iosb_r, read_ast, 0,
                          ast_buffer, 512, ___,
&terminator_mask, ___, ___);

if (!(status & 1))
             exit(status);

sys$clref(1);
        while (1) {
             sys$waitfr(1);        /* wait indefinitely until
somebody ask it to stop * sys$clref(1);
        p = strstr(msg_buffer, "%%[");
        if (p != NULL)
             process_ps_status_messages(p);
        else {
             p = strstr(msg_buffer, "^>");
             if (p != NULL)
                  process_res_fault_request(p);
        }
}
}
/*
 * Disconnect the LAT session.
```

```
 */
        status = sys$qiow (____, lt_chan,
IO$_TTY_PORT|IO$M_LT_DISCON,
               iosb_w, ___, ___,
               ___, ___, ___, ___, ___, ___);
        check_status (status, "$QIOW");
        check_io_status (iosb_w[0],
"IO$_TTY_PORT|IO$M_LT_DISCON", NULL);

return SS$_NORMAL;                    /* Return success
8?
}
```

What is claimed is:

1. A method for outputting characters on an output device comprising the steps of:

storing character descriptions of each of the characters in a computer having storage which is linked to the output device by a communication channel;

receiving, at the output device, character codes which identify characters to be outputted, setting up a raster image of the characters to be outputted, in the course of setting up the raster image, sending information corresponding to the character codes from the output device to the computer having storage via the communication channel, and in response to the character codes sent from the output device to the computer having storage, sending corresponding character descriptions from the computer having storage to the output device via the communication channel.

2. The method of claim 1 wherein the character codes are sent to the output device via a second independent communication channel.

3. The method of claim 2 wherein the second communication channel comprises either a serial or a parallel channel.

4. The method of claim 1 wherein the character codes received at the output device are embedded within page descriptions conforming to a graphical image description language.

5. The method of claim 4 wherein said graphical image description comprises the PostScript® language.

6. The method of claim 1 wherein the common character font comprises a font in an Asian language.

7. The method of claim 1 wherein the output device comprises a printer.

8. A method for printing characters which belong to a common Asian character font on a PostScript® printer comprising storing character descriptions in a host computer which is linked to the printer by a primary communication channel and a secondary communication channel;

sending a PostScript® page description from the host computer to the printer via the primary communication channel, the page description including character codes which identify characters to be printed, setting up, in the printer, a raster image of the characters to be printed, in the course of setting up the raster image, sending character codes from the printer to the host computer via the secondary communication channel, in response to the character codes sent from the printer to the host computer, sending corresponding character descriptions from the host computer to the printer via the secondary communication channel.

9. Apparatus for outputting characters on an output device comprising storage for character descriptions, the storage located in a computr having storage, a communication channel linking the output device to the computer having storage, a port on the output device for receiving character codes which identify characters to be outputted, a character setter for setting up a raster image of the characters to be outputted, means for sending information corresponding to the character codes from the output device to the computer having storage via the communication channel in the course of setting up the raster image, means for sending corresponding character descriptions from the computer having storage to the output device via the communication channel in response to the character codes sent from the output device to the computer having storage.

10. The apparatus of claim 9 wherein the external device comprises a computer having mass storage.

11. The apparatus of claim 9 further comprising a second independent communication channel linking the output device to the external device.

12. The apparatus of claim 11 wherein the second communication channel comprises either a serial or a parallel channel.

13. The apparatus of claim 9 wherein the output device comprises a printer.

* * * * *